March 2, 1971     L. B. GAJDOS     3,567,495
METHOD FOR LINING A PREFORMED PERMEABLE TEXTILE TUBE
Filed Sept. 5, 1968
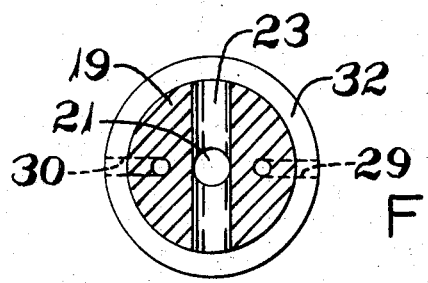
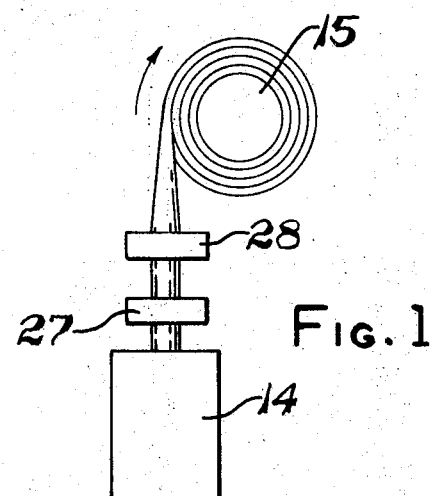
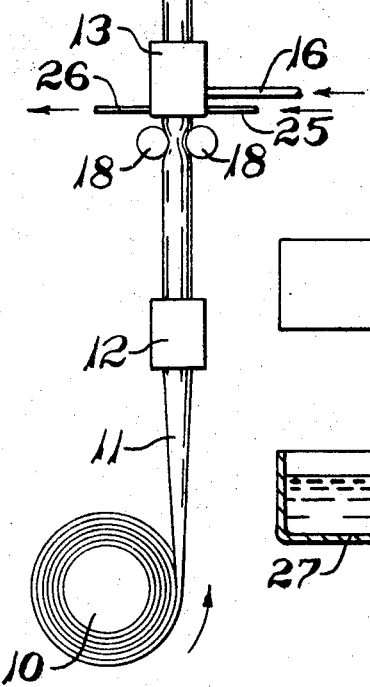
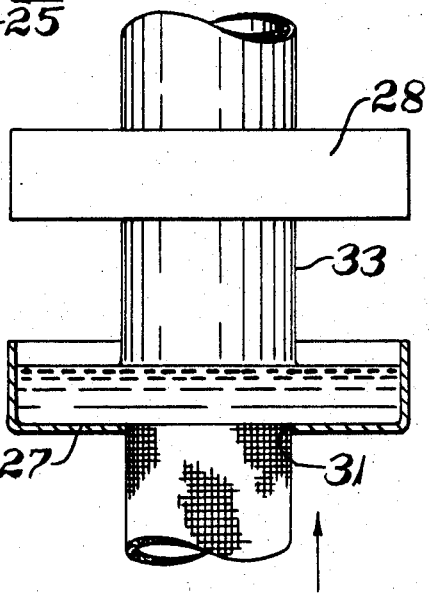
INVENTOR.
LESLIE B. GAJDOS
BY Albert C. Dorsey
ATTY.

United States Patent Office 3,567,495
Patented Mar. 2, 1971

3,567,495
METHOD FOR LINING A PREFORMED PERMEABLE TEXTILE TUBE
Leslie B. Gajdos, Lakewood, Ohio, assignor to The B. F. Goodrich Company, New York, N.Y.
Continuation-in-part of application Ser. No. 372,309, June 3, 1964. This application Sept. 5, 1968, Ser. No. 770,465
Int. Cl. B05b *13/06;* B05c *7/04, 8/04*
U.S. Cl. 117—95   4 Claims

ABSTRACT OF THE DISCLOSURE

A permeable textile tube containing a unique floating mandrel is interiorly coated by passing a plastisol through the textile tube, and through the interior of the mandrel to a coating zone atop the mandrel. An exterior coat is then optionally given to the tube.

CROSS REFERENCE TO RELATED APPLICATION

This is a continuation-in-part of application Ser. No. 372,309, filed June 3, 1964, now abandoned.

BACKGROUND OF THE INVENTION

Textile reinforced garden hose, fire hose, and larger commodity carrying hose have been known for many years. While these and other types of hose have long been used to transport fluids and solids from place to place, it has been a continual problem to make the hose as light in weight as possible without sacrificing strength, wear and abrasion resistance, and other properties. The best hose in the world for a given use will not be popular with the user if he has difficulty handling it because of its weight.

Light weight, low cost hose can be made by extrusion of a plastic or extrudable elastomer stock over a die or a fixed mandrel equipped to supply air or another fluid through the down stream end of the die or mandrel, said fluid maintaining the extruded tube in its desired shape until it cools enough to hold said shape by its own strength. The hose or tube is then wrapped on storage reels and can be heat cured, if desired, in a suitable autoclave. This product has no textile reinforcement however and its tensile and burst strengths are limited. It is unsafe to shut such a hose off at the outlet nozzle. High inlet water pressure may swell or burst the hose. Even with low water pressure, if such a hose is left, filled with water and outlet closed, in the sun, then heat expansion of the water in the hose will swell and/or burst the hose. A hose of this nature can be upgraded into a reinforced hose by slipping it into a preformed woven or braided textile or metal tube sheath or by braiding such a sheath around the hose. It is then usually necessary and desirable to give the sheathed hose a further coat of an abrasion resistant plastic resin or elastomer to protect the reinforcing sheath from snags or tearing as the hose is pulled over rough surfaces. This product requires a minimum of two, and usually three, operations, each of which adds cost of materials, handling and weight. Hose produced in this manner is heavier than hose produced by the process described below because the inner tube must initially be thick enough and strong enough to be self supporting and also to support the braiding or knitting operation involved in the application of the textile tube.

Another problem in the provision of reinforced hose and tubing in the prior art has been the great space and amounts of equipment required to fashion long lengths. In one process of an extrudable elastomer, natural or synthetic rubber or plastic resin, is extruded through a die and around a fixed solid mandrel. With a 50 foot long mandrel, a 50 foot length of hose is obtained, but the handling of such lengths of mandrel is a burdensome chore. To get longer lengths of hose the mandrels may be made up of sections fastened together as the extruder forms the coating. This method requires expensive autoclave equipment to handle the long lengths and there are problems with center deflection of the long mandrel lengths with consequent deformation of the uncured hose. Furthermore, even though the mandrels are prewaxed or otherwise lubricated, it is a difficult task to remove them from the cured hose lengths. A recent patent for reinforced hose shows a hose-making operation placed atop a braiding machine which produces braided textile tubing. As the tubing is braided and formed it is passed up over a fixed mandrel and coated interiorly with a very viscous gelled plastisol material. High pressures of 500–800 p.s.i. are required to pump the plastigel (a vinyl material) around the fixed mandrel to form the tube inner coating. It is not always convenient or desirable to place a hose-making operation directly over a braiding machine. Operation of the braider can be interfered with in numerous ways by accidental droppings of dirt and extraneous items from equipment above. Even if the braider is suitably enclosed, the process is limited in production speed to the output speed of the braider. Particularly in larger tube diameter sizes, this is undesirable. A stronger hose is obtained when the textile tubing is completely impregnated and its interstices are filled with plastisol. The prior art process does not give this full impregnation, but deliberately avoids it.

In another known process a plastisol is fed into a machine through a floating horizontal mandrel interiorly of a woven tube and extruded into the tube in the form of a plurality of concentric films. Gas or other fluid pressure is used to distend the films and conform them to the interior wall of the woven tube. Hose or tubing formed in this manner may tend to show delamination of the successive lining layers as it is difficult to get complete overall adhesion of each of the many layers needed to build up desired thicknesses to the adjacent layers. This process also fails to fill the interstices of the textile tubing.

It will be desirable to provide a process for textile reinforced hose that can make long continuous lengths, will not require high pressure pumping equipment and will not need gelling or thickening agents in the solutions used. The hose should be light weight, hence the inner and outer (if used) coats on the textile tubing should not be over $\frac{1}{32}$ inch in thickness each. The prior art processes produce a reinforced hose of round cross section which is designed to be noncollapsible or is so inherently bulky that it is not collapsible. When these hoses are coiled, as for shipment or storage, they take up space in proportion to their diameters. A hose ½ inch in diameter which is coiled in normal fashion about a central core, making, say, 15 loops about the core, will occupy a minimum square of $15 \times \frac{1}{2}'' = 7\frac{1}{2}''$ on a side and the thickness of the package will be at least ½". If such a hose can be collapsed into essentially the form of a flat belt, and then coiled it will occupy less than ½ this area and volume. Such a hose will have to be lighter in weight than prior art hose to be collapsible in this fashion, and this will be a bonus for the hose user. The problem in making a lightweight collapsible textile reinforced hose is to restrict the hose weight while having it retain sufficient strength to resist the pressures and strains of use and abuse described above.

SUMMARY OF THE INVENTION

This invention provides a rapid, economical method for making textile reinforced elastomeric hose that sacrifices none of the desirable properties exhibited by previously known hoses and overcomes some deficiencies of said hoses. Hose, or tubing, can be made continuously in unlimited lengths. In smaller sizes, such as garden hose, the product of this process can be collapsed readily into a belt-like configuration and wound into a compact, lightweight, easily transportable bundle, even at temperatures as low as 32° F. when ordinary rubber and vinyl plastic hose becomes stiff, bulky, and relatively unmanageable. Broadly the method of the invention provides a preformed permeable textile tube with an impermeable lining integral therewith. Thickness of the coating applied to the interior of the tube is easily controlled within limits of 0.001 to 0.050 inch. An abrasion resistant outer coating can be applied subsequently if desired. The deficiencies of fixed mandrel, extensible mandrel and braiding in place systems are avoided. The process fills the interstices of the reinforcing textile tube with plastisol, but the overall thickness of the hose is kept so low (below 3/32 inch when both an inner and an outer coat are applied to the textile tube) that the construction readily collapses from a round cross section to a flat, belt-like cross section which is more compact and efficient for rolling up the hose for storage and packaging.

The process is characterized by the steps of passing a preformed permeable textile tube through an ironer to remove any wrinkles, over an especially designed vertical floating mandrel which remains in place inside the textile tube through the action of a counterweight and of guides external to the textile tube which are further described below, then passing an ungelled thermoplastic material, preferably a vinyl plastisol, through the permeable wall of the vertically positioned tube to the tube interior via passageways in the mandrel thereby simultaneously filling the interstices of said tube, coating the interior wall of the tube with an impermeable lining and then fusing said coating in place by the application of heat. This process is especially useful for speedily rendering a continuous woven light weight fabric tube, such as one of nylon, for example, interiorly impermeable with only a slight increase in thickness of the tube. The textile tube is continuously advanced through the processing zone and a thermoplastic material in vinyl plastisol form is passed through the textile tube and is coated on the interior wall of the tube. As the interiorly coated tube advances further, it passes through a heating zone where the deposited plastisol is fused and set to form a thin, impermeable lining for the tube. In a further step, an abrasion resistant, long wearing, lightweight cover material, a second vinyl plastisol optionally containing antioxidants coloring pigments and the like, may be applied to the outer surface of the tube by a vertical wetting technique and fused in place by the application of heat.

A primary feature of the invention is the provision of the unique, short length, interiorly channeled, floating mandrel which constitutes an apparatus for supplying a tube of preformed permeable textile material with an interior lining comprising a layer of heat-fusible plastisol which will form an impermeable lining for said tube. The apparatus is characterized by the facts that it comprises, in combination with means for advancing the permeable tube, a means for feeding a suitable plastisol material to a pressure equalizing chamber in a coating head, from which chamber the plastisol passes through the permeable tube wall to a registering chamber in said floating mandrel, passage means through the mandrel to an upper outlet where the plastisol first forms a fluid column bounded by the interior surface of the permeable tube and the top plane of the said mandrel and becomes coated on to the tube wall as an interior lining thereof as the tube advances past this coating zone, counter-weight means inside said tube, but not touching the wall of said tube, and extending downward from said mandrel and integral therewith for balancing the floating mandrel and connected thereto by a neck connection of lesser diameter than that of the mandrel and the counterweight and whose diameter is also less than the minimum distance between opposite parts of positioning rollers located external of said tube and set a distance apart slightly less than the diameter of said textile tube so as to cooperate with the said counterweight to maintain the mandrel's relatively stationary attitude in the tube, and heating means positioned past the coating zone for fusing the plastisol lining to an impermeable state on the interior surface of the textile tube and in the interstices thereof. Further means are provided for supplying air to a separate interior passageway system in the mandrel, conducting said air to an outlet above the level of the fluid plastisol column, where it serves to keep the newly lined tube in the desired cylindrical shape and to assist in keeping the lining adhered to the inner wall of said tube until said lining is fused into place. Excess air is led back down through a second air channel in the mandrel and released through the permeable tube below the registering chambers and below the point where plastisol has filled the interstices of the textile tube.

A feature of the floating mandrel of this invention is that it makes possible a novel process for manufacturing an interiorly impermeable tube of unlimited length which can be fabricated into useful articles such as hose. The process of the invention is particularly adapted to the manufacture of hose of garden hose dimensions, said hose being lightweight and compactable by collapsing from round cross-section to flat cross-section then rolling and/or folding into very small configurations even at low temperatures, yet having great strength because of the textile tube reinforcement.

This type of hose differs from presently known hose in that it is lighter, more readily compactable and more easily handled, particularly at low temperatures at which known plastic hose, usually vinyl plastic, becomes stiff and unwieldy.

DETAILED DESCRIPTION OF THE INVENTION

A means for carrying out the invention is now described by way of illustration without limiting its scope. This means is described by way of example and is illustrated in the drawings of which FIG. 1 is a schematic view of an apparatus for providing a preformed continuous permeable textile tube with an impermeable inner lining and an abrasion resistant outer coating according to the invention, and FIG. 2 is a partial axial cross section of the apparatus shown in FIG. 1, particularly showing the details of the unique floating mandrel and the interior coating head. FIG. 3 is a cross sectional view of the mandrel taken at any of the plastisol passage levels. FIG. 4 is a partial axial cross section of apparatus shown in FIG. 1, particularly showing details of the exterior coating head where an outside coat is applied to the tube.

In FIG. 1, a reel 10 of woven nylon tubing 11 is shown, the axis of which turns on supports not shown. The apparatus is set up in a vertical configuration and requires relatively little floor space area. On leaving reel 10, tube 11 enters an ironer 12 where creases are removed. Next, tube 11 passes between mandrel positioner rolls 18 and enters coating head 13 where it receives an inner lining of plastisol material. The lined tube leaves coating head 13 and the lining is fused to an impermeable state by a heat treatment in fusing duct 14. The interiorly lined tube then passes through coating head 27 where an external plastisol coat 33 is applied to said tube, and then passes through fusing duct 28 to fuse said outer coat and finally passes on to storage reel 15 whose rotating axis is driven by a means not shown, said means providing the driving force for moving the tube 11 in a continuous vertical path through the apparatus. Plastisol from a tank not shown is pumped into the coating head 13 at inlet 16 at room temperature at pressures of about one p.s.i. maximum.

As seen in FIG. 2, after leaving ironer 12 permeable tube 11 is passed over mandrel counterweight 17, between mandrel positioner rolls 18, over mandrel 19, through coating head 13, and coating zone 20. Floating mandrel 19, counterbalanced by weight 17, so that it will not advance upwards with tube 11 and prevented from falling downward by positioner rolls 18, rides in a stable position in coating head 13 maintaining accurate registry of the plastisol chambers in the coating head 13 and in the floating mandrel 19. Counterweight 17 is fastened to the mandrel 19 through the vertical center line of the mandrel, preferably at the lowest midpoint of the mandrel by a shaft of lesser diameter than said mandrel. Counterweight 17 has a diameter no greater than the diameter of mandrel 19 and is preferably the same diameter as mandrel 19. The lower portion of the mandrel is solid, and from a point about ¼ up the height of the mandrel and inside coating head 13, a passageway 21 is drilled extending to the top surface of the mandrel. A solution inlet 16 enters coating head 13 at an angle to the centerline of the mandrel and connects to equalizing chamber 22. A registering chamber 32 in mandrel 19 is in turn connected to a plurality of ducts 23, leading to the passageway 21 of the mandrel. Tube 11 forms a permeable barrier between the registering chambers 22 and 32. Plastisol solution from a vessel (not shown) enters coating head 13 via solution inlet 16, flows into equalizing chamber 22, then flows through to the interior of tube 11 to chamber 32, passes through ducts 23 up through passageway 21 and fills the entire cross-sectional area of the tube above the mandrel top for a height of approximately 1½ inches, thus forming the coating zone 20. The level of plastisol coating solution and the height of coating zone may be varied slightly but is preferably maintained constant by control of the pressure at a pumping means (not shown) which pumps the plastisol solution into coating head 13. The fit of mandrel 19 in tube 11 and of tube 11 in coating head 13 is free enough to allow smooth advance of tube 11, but snug enough that any plastisol on the outside of tube 11 is wiped off the tube and retained in chamber 22 as the tube leaves the chamber. The interstices of tube 11 are filled with plastisol. The fact that mandrel positioner rolls 18 are mounted externally of tube 11 and that mandrel 19 is in tube 11 lets tube 11 move with mandrel 19 held still.

Tube 11 is advanced through the coating apparatus by drive means (not shown) which rotates take-up reel 15. Through a second passageway system in mandrel 19 low pressure air enters coating head 13 at entrance 25, passes through tube 11 to registering passageway 29 in the mandrel, which is separate from passageway 21, and brings air under slight pressure to a point above coating zone 20. This air serves to keep the interiorly lined tube 11 in cylindrical shape. The lined tube, between the top of coating zone 20 and the point at which the tube is collapsed for take-up on the storage reel 15 forms an air-tight container. To prevent excessive air pressure from building up in the lined tube, passageway 30 is provided to carry air from above coating zone 20 downward through the mandrel, through unlined tube 11 and out of coating head 13 at outlet 26. The excess air can freely exit through tube 11 because the passageway 30 outlet is below the point at which the tube receives its interior lining. As tube 11 leaves the coating zone 20, a lining 24 of plastisol is deposited on the inner surface. The thickness of this deposited lining is about ⅟₃₂ inch and can be regulated from 0.001 to 0.050 inch by the speed of travel of tube 11 and by the viscosity of the plastisol solution. Slower speeds and higher viscosities favor thicker linings. Faster tube speeds and lower viscosities produce thinner linings. Plastisol viscosity depends on temperature of the plastisol and concentration of the plastisol. It is preferred to operate at room temperature with plastisols of 400 to 10,000 centipoises Brookfield viscosity. The slight variations in lining thickness that may be required are readily obtained by slightly speeding up or slowing down the throughput rate of tube 11.

Tube 11, with its newly formed inner lining 24 leaves coating head 13 and enters fusing duct 14 where heat to fuse the plastisol is supplied by means not shown. After subjection to this fusing cycle, the interiorly lined woven tube may enter a second coating head 27 via a bottom entrance opening 31 which is sized to fit tube 11 snugly enough and tightly enough that no fluid from coating head 27 leaks down along the tube. In coating head 27 an exterior coating 33 of plastisol is applied to tube 11 which then enters fusing duct 28 where heat is supplied by means not shown to fuse the exterior coat 33. After this second fusing cycle, the interiorly and exteriorly coated tube is collapsed to a flat belt-like cross-section and stored on take-up reel 15. The textile tube and its inner and outer coats are thin enough to collapse readily from a cylindrical shape maintained during the processing to a flat, easily rolled, space saving configuration.

Floating mandrel 19 is held balanced in coating head 13 by the combined forces of mandrel positioner rolls 18 and mandrel counterweight 17.

The unique feature of this floating mandrel is the set of passageways drilled therein to allow the plastisol solution, once it has penetrated to the interior of the woven tube, to pass on into the mandrel, then up through the mandrel to form the coating zone at the top thereof. The passageway configuration avoids the need for the plastisol to be forced between the mandrel and the tube inner wall under pressure to form a lining as in the prior art. The plastisol is held at such a depth in the coating zone, that the advancing tube picks up an inner lining layer of the desired thickness. The plastisol has an affinity for the tube material and readily deposits thereon. The mandrel necessarily extends from below the plastisol inlet in the coating head upward to a position above this inlet. A second and separate passageway system is provided in the mandrel to supply air under low pressure above the coating zone for the purpose of keeping the tube in inflated form to aid in uniform application of the plastisol lining. Excess air is bled off, down through the mandrel and back out through the tube at a point away from the air inlet and below the coating zone.

The uniquely channeled floating mandrel of this invention is prepared in a range of sizes to provide plastisol inner linings to permeable textile tubes of any desired diameter from fractions of an inch for garden hose to several inches for fire hose, petroleum hose, powder transport hose and the like. For any given size textile tube which is to be coated, a mandrel with a diameter just less than the diameter of said tube is selected so that the tube pulls easily through the system. There is very little friction between the elements tube 11, mandrel positioned rolls 18 and mandrel 19 and only low power requirements are needed to drive take up reel 15.

The permeable tubes may be any available material, preferably a woven textile material such as nylon, polyester terephthalate, polyacrylonitrile, rayon, jute, cotton and the like. Woven nylon is preferred because of its good strength to weight ratio, capacity to reinforce, and resistance to moisture, insects and the like.

The favored lining and coating materials to employ in the apparatus of this invention are ungelled vinyl plastisols, paste resins of polyvinylchloride and vinylchloride copolymer resins dissolved in plasticizers therefor, such as dioctyl phthalate, tricresyl phosphate and the like. These plastisols are readily pumped, flow easily through the openings in the permeable tube, and readily coat the inner wall of the permeable tube in the coating zone. They gel at temperatures of 200–212° F., and at 300–350° F. they fuse to form an impermeable, homogeneous, lightweight, tough, elastic lining for the fabric tube. A vinyl plastisol also readily coats the outside of the lined nylon tube and readily fuses to give an abrasion resistant outer coat thereto. These materials are fused by heat alone; no pressure is needed.

When the inner-lined tube of this invention is given an abrasion resistant outercoat, an extremely strong and very thin three ply tubing or hose is obtained which has been produced by a single continuous process, which is very lightweight, which is easily handled and which can be rolled into extremely compact rolls. A 50 foot length of ½ inch I.D. hose of the invention with one-third the weight of an equal length of textile reinforced commercial hose can be flattened and rolled into a coil less than eight inches in diameter compared to a coil over 16 inches in diameter found when the commercial hose is so rolled. The extreme thinness and lightweight of the reinforced hose produced by this process is made possible because the inner and outer elastomer coats are each applied to the tube and the strong textile tube carries the weight of the structure as it moves through the process. Neither elastomer coat has to be made heavy enough to be self-supporting at any time. The overall structure is therefore thinner and lighter in weight than hose of comparable strength known in the art.

I claim:
1. A process for providing a preformed permeable flexible textile tube with an impermeable, inner lining integral therewith and filling the interstices thereof, said process comprising the steps of continuously advancing said tube in a vertical path over a floating mandrel, passing a plastisol from the exterior into the interior of said tube through the wall thereof and then into the interior of said mandrel, through passageways in said mandrel to the top thereof, where said plastisol forms a pool coating zone inside said tube and atop said mandrel and becomes coated on the inner wall of said tube in said coating zone, admitting air under low pressure to said mandrel in passageways separate from those carrying said plastisol solution, and conveying said air through said mandrel to the top of said plastisol pool, excessive air pressure being prevented from building up by bleeding air from above said plastisol pool down through said mandrel and through the walls of said permeable tube at a point before said plastisol solution first enters said tube and plugs the interstices thereof, the thickness of said plastisol coating being regulated by the speed of travel of said tube and the viscosity of said plastisol, passing said interiorly coated tube through a fusing zone where said plastisol is fused to a smooth inner lining for said tube that becomes integral therewith.

2. A process for providing a preformed permeable tube with an impermeable inner lining integral therewith and filling the interstices thereof, and an abrasion resistant outer lining integral therewith, said process comprising the steps of continuously advancing said permeable tube in a vertical path over a floating mandrel; passing a plastisol from the exterior into the interior of said tube through the wall thereof; passing said plastisol through passageways to the interior of said mandrel and thence to the top of said mandrel to a coating zone inside said tube and above said mandrel; simultaneously passing air under low pressure into said mandrel via passageways separate from those carrying said plastisol; conveying said air through said mandrel to the top of said coating zone; preventing excessive pressure from building up by bleeding air from above coating zone down through said mandrel and through the walls of said permeable tube, at a point before said plastisol solution enters said tube; coating said plastisol on the interior wall of said tube in said coating zone, the thickness of said plastisol coating being regulated by the speed of travel of said tube and the viscosity of said plastisol, and; passing said interiorly coated tube through a heat zone where said interior lining is fused; passing said interiorly coated tube in a vertical path through a second coating zone where a second plastisol is coated on the outside thereof, and; passing said internally and externally coated tube through a second heating zone where said external coating is fused.

3. Apparatus for providing an impermeable lining for for a preformed tube of permeable material comprising in combination means for continuously advancing said permeable tube in a vertical path over a floating mandrel, said mandrel being controlled in its position inside said tube by positioning rollers external to said tube and a counterweight means internal of said tube, means for forcing a plastisol through the wall of said permeable tube from its exterior to its interior; and thence, through passageways in said floating mandrel to a coating zone bounded by the inner wall of said tube and the top of said mandrel where said plastisol is interiorly coated on said tube, the thickness of said plastisol coating being regulated by the speed of travel of said tube and the viscosity of said plastisol; a heating zone for fusing said plastisol coating as an inner lining for said tube as said tube leaves said coating zone; a second coating zone, entered in a vertical path by said interiorly coated tube through a fluid-tight friction fit opening in the bottom thereof; and a second heating zone wherein the coating applied to said tube in said second coating zone is fused to the solid state.

4. Apparatus as described in claim 3 wherein said floating mandrel has a second and separate passageway system for conveying air under low pressure from the lower part of the mandrel to the top of said coating zone and then back down through the mandrel and out through the wall of said permeable tube.

References Cited

UNITED STATES PATENTS

| | | | |
|---|---|---|---|
| 2,767,431 | 10/1956 | De Laubarede | 117—95X |
| 2,873,715 | 2/1959 | Signer | 118—34 |
| 3,066,720 | 12/1962 | Fontaine | 118—408X |
| 3,156,600 | 11/1964 | Fontaine | 118—408X |
| 3,157,544 | 11/1964 | Lichtey | 117—95X |

ALFRED L. LEAVITT, Primary Examiner

E. G. WHITBY, Assistant Examiner

U.S. Cl. X.R.

117—161; 118—67, 408